US011694031B2

(12) United States Patent
Muthuswamy et al.

(10) Patent No.: US 11,694,031 B2
(45) Date of Patent: Jul. 4, 2023

(54) IDENTIFYING ROUTINE COMMUNICATION CONTENT

(71) Applicant: International Business Machines Corporation, Armonk, NY (US)

(72) Inventors: Srinivasan S. Muthuswamy, Bangalore (IN); Subhendu Das, Chapel Hill, NC (US); Shweta Shandilya, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 17/106,254

(22) Filed: Nov. 30, 2020

(65) Prior Publication Data
US 2022/0171934 A1   Jun. 2, 2022

(51) Int. Cl.
*G06F 40/289* (2020.01)
*G06N 3/08* (2023.01)
*G06F 40/166* (2020.01)
*G06F 40/205* (2020.01)

(52) U.S. Cl.
CPC .......... *G06F 40/289* (2020.01); *G06F 40/166* (2020.01); *G06N 3/08* (2013.01); *G06F 40/205* (2020.01)

(58) Field of Classification Search
CPC .... G06F 40/289; G06F 40/166; G06F 40/205; G06F 40/274; G06F 40/284; G06N 3/08
USPC ............................................................ 704/9
See application file for complete search history.

(56) References Cited

U.S. PATENT DOCUMENTS

| | | | |
|---|---|---|---|
| 11,226,720 B1* | 1/2022 | Vandivere | G06F 3/0482 |
| 11,423,303 B1* | 8/2022 | Jiao | G06N 3/0454 |
| 2011/0206198 A1 | 8/2011 | Freedman | |
| 2015/0242391 A1* | 8/2015 | Goel | G06F 40/30 |
| | | | 704/9 |
| 2016/0350675 A1 | 12/2016 | Laks | |
| 2019/0005021 A1 | 1/2019 | Miller | |
| 2019/0043483 A1 | 2/2019 | Chakraborty | |
| 2019/0228419 A1 | 7/2019 | Sampath | |
| 2019/0341036 A1 | 11/2019 | Zhang | |
| 2020/0147865 A1* | 5/2020 | Hoffmann | G02B 21/33 |
| 2022/0004564 A1* | 1/2022 | Xu | G06F 16/278 |

FOREIGN PATENT DOCUMENTS

WO      2018208514 A1    11/2018

OTHER PUBLICATIONS

"Use of AI in Online Content Moderation", Cambridge Consultants, 2019 Report Produced on Behalf of OFcom, 84 pages.

* cited by examiner

*Primary Examiner* — Thierry L Pham
(74) *Attorney, Agent, or Firm* — Douglas M. Crockatt

(57) ABSTRACT

Approaches presented herein enable identification of routine communication content. More specifically, a communication between one or more users is received. Words or phrases in the communication that are contained in a database of words or phrases related to misconduct are identified. The identified words or phrases are removed from the communication to create a set of remaining words. The set of remaining words are analyzed to predict the likelihood of the removed words or phrases appearing in the communication, such that a confidence level of the prediction is determined. In response to the determined confidence level being high, the identified words or phrases in the communication are classified as routine.

20 Claims, 5 Drawing Sheets

IDENTIFYING ROUTINE COMMUNICATION CONTENT

TECHNICAL FIELD

The present invention relates generally to identifying communication content and, more specifically, to identifying words or phrases in communications that appear to be related to misconduct but are just routine communications.

BACKGROUND

Mitigation of misconduct and malfeasance such as insider trading activity, and the like, in the financial services industry and other industries present significant challenges. Communications between people working in various industries may be monitored to detect potential misconduct. When certain words or phrases are used by people in communications, the use of those words and phrases may initially appear to indicate misconduct. However, most communications between people are routine "business as usual" communications and are unrelated to potential misconduct.

SUMMARY

Approaches presented herein enable identification of routine communication content. More specifically, a communication between one or more users is received. Words or phrases in the communication that are contained in a database of words or phrases related to misconduct are identified. The identified words or phrases are removed from the communication to create a set of remaining words. The set of remaining words are analyzed to predict the likelihood of the removed words or phrases appearing in the communication, such that a confidence level of the prediction is determined. In response to the determined confidence level being high, the identified words or phrases in the communication are classified as routine.

One aspect of the present invention includes a method for identifying routine communication content, comprising: receiving a communication between one or more users, identifying words or phrases in the communication that are contained in a database of words or phrases related to misconduct, removing the identified words or phrases from the communication to create a set of remaining words, analyzing the set of remaining words to predict the likelihood of the removed words or phrases appearing in the communication, wherein a confidence level of the prediction is determined, and responsive to the determined confidence level being high, classifying the identified words or phrases in the communication as routine.

Another aspect of the present invention includes a computer system for identifying routine communication content, the computer system comprising: a memory medium comprising program instructions, a bus coupled to the memory medium, and a processor, for executing the program instructions, coupled to a routine communication identification engine via the bus that when executing the program instructions causes the system to: receive a communication between one or more users, identify words or phrases in the communication that are contained in a database of words or phrases related to misconduct, remove the identified words or phrases from the communication to create a set of remaining words, analyze the set of remaining words to predict the likelihood of the removed words or phrases appearing in the communication, wherein a confidence level of the prediction is determined, and responsive to the determined confidence level being high, classify the identified words or phrases in the communication as routine.

Yet another aspect of the present invention includes a computer program product for identifying routine communication content, the computer program product comprising a computer readable hardware storage device, and program instructions stored on the computer readable hardware storage device, to: receive a communication between one or more users, identify words or phrases in the communication that are contained in a database of words or phrases related to misconduct, remove the identified words or phrases from the communication to create a set of remaining words, analyze the set of remaining words to predict the likelihood of the removed words or phrases appearing in the communication, wherein a confidence level of the prediction is determined, and responsive to the determined confidence level being high, classify the identified words or phrases in the communication as routine.

Still yet, any of the components of the present invention could be deployed, managed, serviced, etc., by a service provider who offers to identify routine communication content in a computer system.

Embodiments of the present invention also provide related systems, methods, and/or program products.

BRIEF DESCRIPTION OF THE DRAWINGS

These and other features of this invention will be more readily understood from the following detailed description of the various aspects of the invention taken in conjunction with the accompanying drawings in which.

Figure 1:
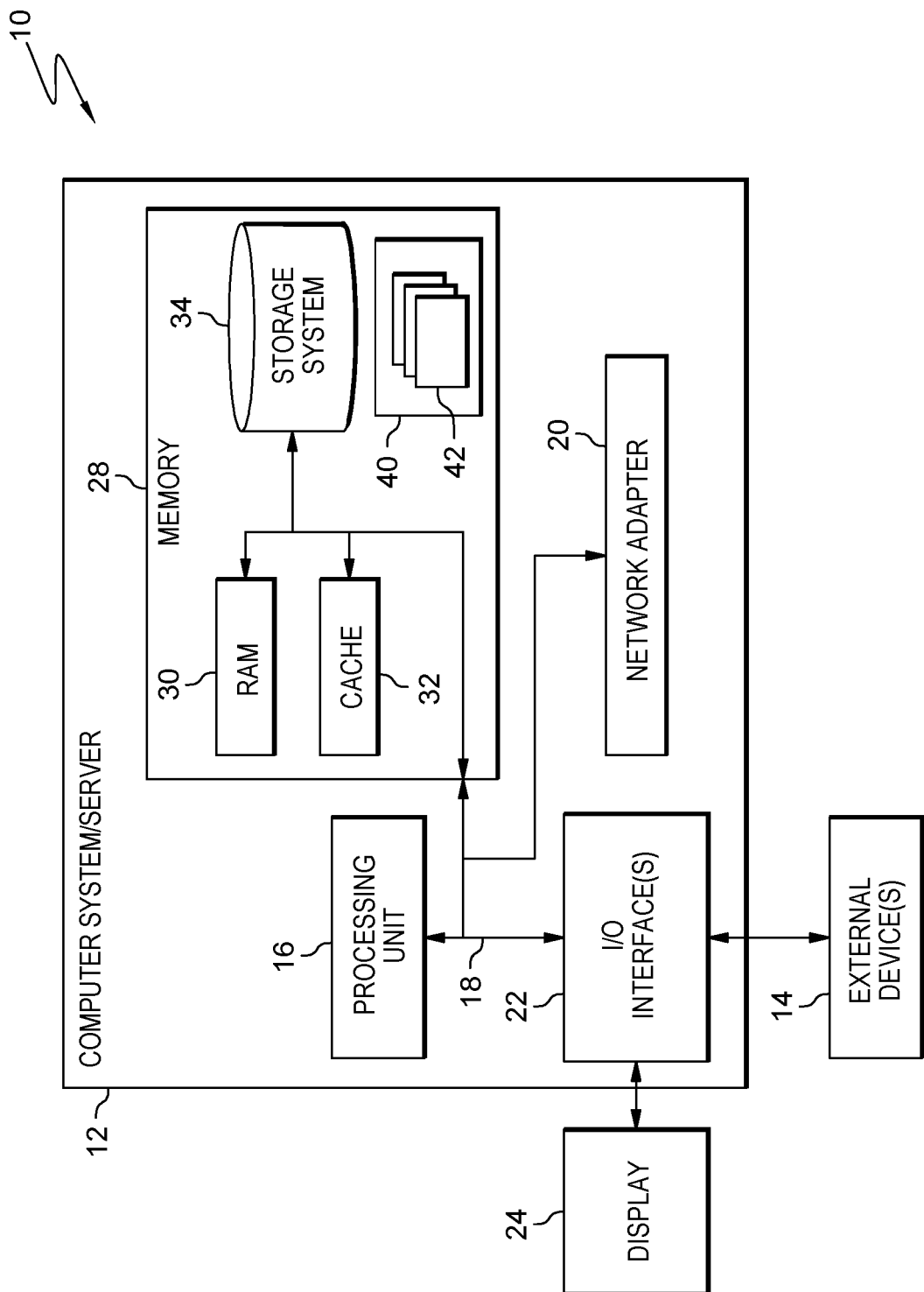
FIG. 1 shows an architecture in which the invention may be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein provide for identification of routine communication content. More specifically, a communication between one or more users is received. Words or phrases in the communication that are contained in a database of words or phrases related to misconduct are identified. The identified words or phrases are removed from the communication to create a set of remaining words. The set of remaining words are analyzed to predict the likelihood of the removed words or phrases appearing in the communication, such that a confidence level of the prediction is determined. In response to the determined confidence level being high, the identified words or phrases in the communication are classified as routine.

Referring now to FIG. 1, a computerized implementation 10 of an embodiment for identifying routine communication content will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system/server 12, which is operational with numerous other (e.g., special purpose) computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system/server 12 is intended to demonstrate that some or all of the components of implementation 10 could be deployed, managed, serviced, etc., by a service provider who offers to implement, deploy, and/or perform the functions of the present invention for others.

Computer system/server 12 is intended to represent any type of computer system that may be implemented in deploying/realizing the teachings recited herein. Computer system/server 12 may be described in the general context of computer system/server executable instructions, such as program modules, being executed by a computer system. Generally, program modules may include routines, programs, objects, components, logic, data structures, and so on, that perform particular tasks or implement particular abstract data types. In this particular example, computer system/server 12 represents an illustrative system for identifying routine communication content. It should be understood that any other computers implemented under the present invention may have different components/software, but can perform similar functions.

Computer system/server 12 in computerized implementation 10 is shown in the form of a computing device. The components of computer system/server 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for identifying routine communication content, which is stored in memory 28, storage system 34, and/or program/utility 40. While executing computer program code, processing unit 16 can read and/or write data to/from memory 28, storage system 34, and program/utility 40.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and/or an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

The inventors of the present invention have found that existing approaches to identify words or phrases used in communications between people which are related to misconduct have a significant limitation, that these approaches are typically not able to identify when the words or phrases are used in a routine, business-as-usual context. Consequently, these existing approaches have a relatively high false-positive rate.

Accordingly, the inventors of the present invention have developed an approach to identify words or phrases which are related to financial or other types of misconduct, and to also determine when those words or phrases are used in an innocuous, routine, business-as-usual context.

Furthermore, embodiments of the present invention offer an advantage of determining a confidence level of the identification of the words or phrases which are related to financial or other types of misconduct, which allows a discernment as to whether the underlying communication should be reviewed, for example by management, security personnel, or a compliance officer.

Figure 2:
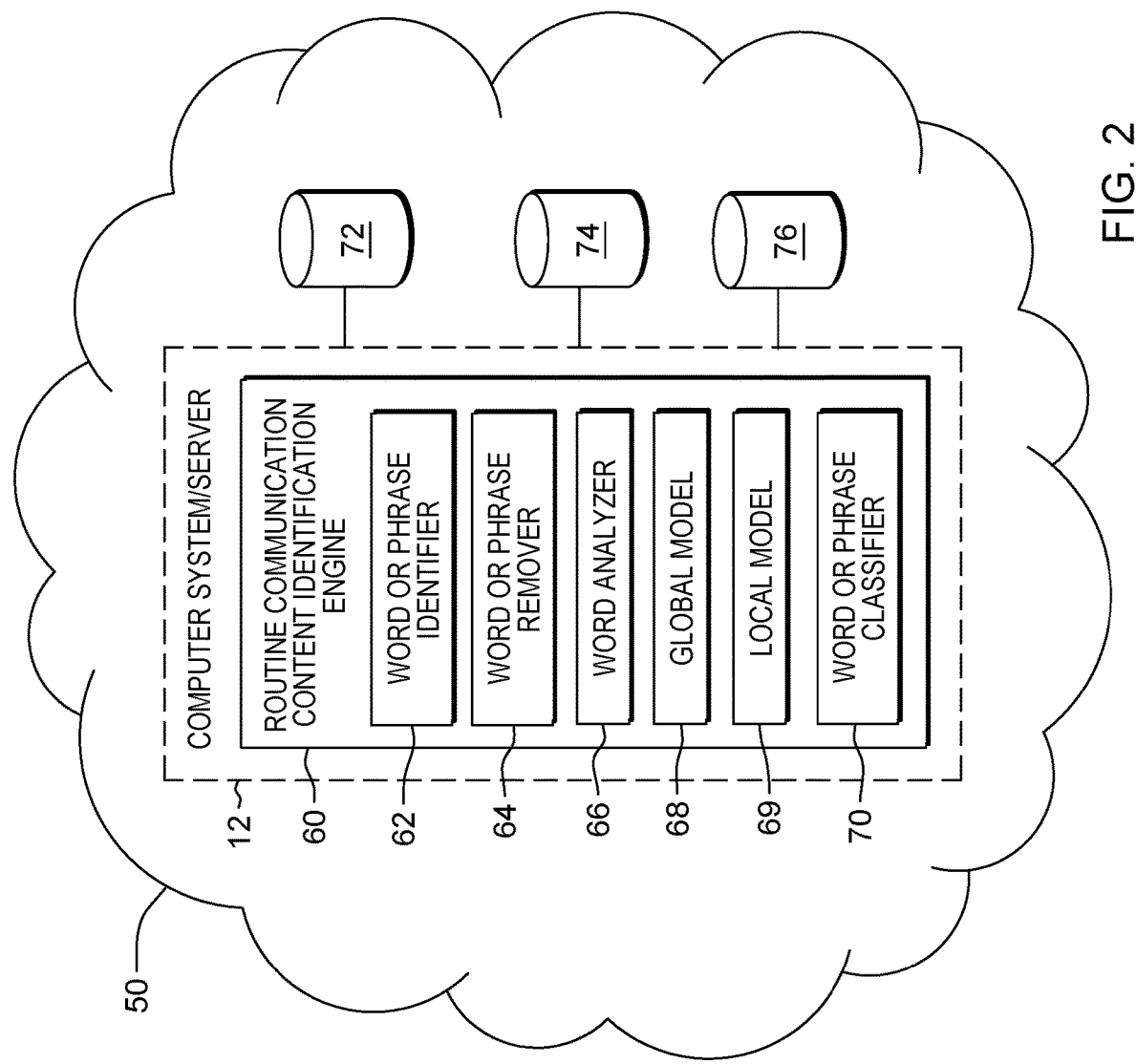
FIG. 2 shows a system diagram describing the functionality discussed herein according to illustrative embodiments.

Referring now to FIG. 2, a system diagram describing the functionality discussed herein according to an embodiment of the present invention is shown. It is understood that the teachings recited herein may be practiced within any type of computing environment, including, but not limited to, a networked computing environment (e.g., a cloud computing environment 50). A stand-alone computer system/server 12 is shown in FIG. 2 for illustrative purposes only. In the event the teachings recited herein are practiced in a networked computing environment, each client need not have a routine communication content identification engine 60 (hereinafter "system 60"). Rather, all or part of system 60 could be loaded on a server or server-capable device that communicates (e.g., wirelessly) with the clients to provide for routine communication content identification. Regardless, as depicted, system 60 is shown within computer system/server 12. In general, system 60 can be implemented as program/utility 40 on computer system 12 of FIG. 1 and can enable the functions recited herein.

Along these lines, system 60 may perform multiple functions. Specifically, among other functions, system 60 can identify routine communication content in a networked computing environment. To accomplish this, system 60 can include a set of components (e.g., program modules 42 of FIG. 1) for carrying out embodiments of the present invention. These components can include, but are not limited to, word or phrase identifier 62, word or phrase remover 64, word analyzer 66, global model 68, local model 69, and Word or Phrase Classifier 70.

Through computer system/server 12, system 60 can receive a communication between one or more users or people, for example, an email communication, a text message, an instant message, a recorded or digitized voice communication, or any other type of communication between one or more users or people. Words or phrases in the communication, that are contained in database 72 of words or phrases related to misconduct, are identified by word or phrase identifier 62. In one embodiment, identifier 62 may be implemented as a software module that parses one or more text strings, and compares words or phrases in the text string to words or phrases in database 72. By way of example, the one or more text strings may be from an email communication, a text message, an instant message, or a recorded or digitized voice communication that has been converted to a text string by a voice recognition speech to text system.

The identified words or phrases are removed from the communication by word or phrase remover 64 to create a set of remaining words. In one embodiment, remover 64 may be implemented as a software module that parses out words or phrases in a text string, deletes the words or phrases identified by identifier 62 from the text string, and creates a set of words that remain in the text string.

The set of remaining words are analyzed by word analyzer 66 to predict the likelihood of the words or phrases removed by remover 64 appearing in the communication between one or more users or people. Analyzer 66 further determines a confidence level of the prediction. In one embodiment, analyzer 66 utilizes global model 68 to analyze the set of remaining words, and predict the likelihood of the words or phrases removed by remover 64 appearing in the communication between one or more users or people. A global set of words or phrases are stored in database 74 which are used by a set of users or people who use similar words or phrases, and are used to train global model 68.

Analyzer 66 may also utilize local model 69 to analyze the set of remaining words, and predict the likelihood of the words or phrases removed by remover 64 appearing in the communication between one or more users or people. A local set of words or phrases are stored in database 76 which are used by a set of users or people who communicate with each other, and are used to train local model 69.

In one embodiment, global model 68 and local model 69 may be implemented using a long short-term memory (LSTM) recurrent neural network (RNN). An LSTM-RNN is an artificial neural network that contains LSTM blocks instead of, or in addition to, regular network units. An LSTM block may be described as a "smart" network unit that can remember a value for an arbitrary length of time. An LSTM block contains gates that determine when the input is significant enough to remember, when it should continue to remember or forget the value, and when it should output the value.

An LSTM-RNN model may parse and encode a word or phrase history such that the history may be leveraged to predict words related to the history. More specifically, one or more LSTM-RNN implemented models may be applied to the set of remaining words being analyzed by analyzer 66 such that the one or more models are trained to predict the likelihood of the removed words or phrases appearing in the communication between one or more users or people using, among other thing, at least one of temporal, social network, contextual, and topical meta-data of the communication.

Analyzer 66 also determines a confidence level of the likelihood of the removed words or phrases appearing in the communication between one or more users or people. Confidence levels or intervals in LSTM-RNN models can be determined, for example by considering the rate of neural network node dropout and other techniques. In any event, the use of LSTM-RNN models for prediction, and determining confidence levels or intervals thereof is known, and further description is not believed necessary.

If the determined confidence level is high, for example 70% or more confidence, word or phrase classifier 70 classifies the identified words or phrases in the communication between one or more use users or people as routine or "business as usual". If the determined confidence level is low, for example 20% or less, classifier 70 classifies the identified words or phrases in the communication between one or more use users or people as non-routine, and flags the communication for review.

Figure 3:
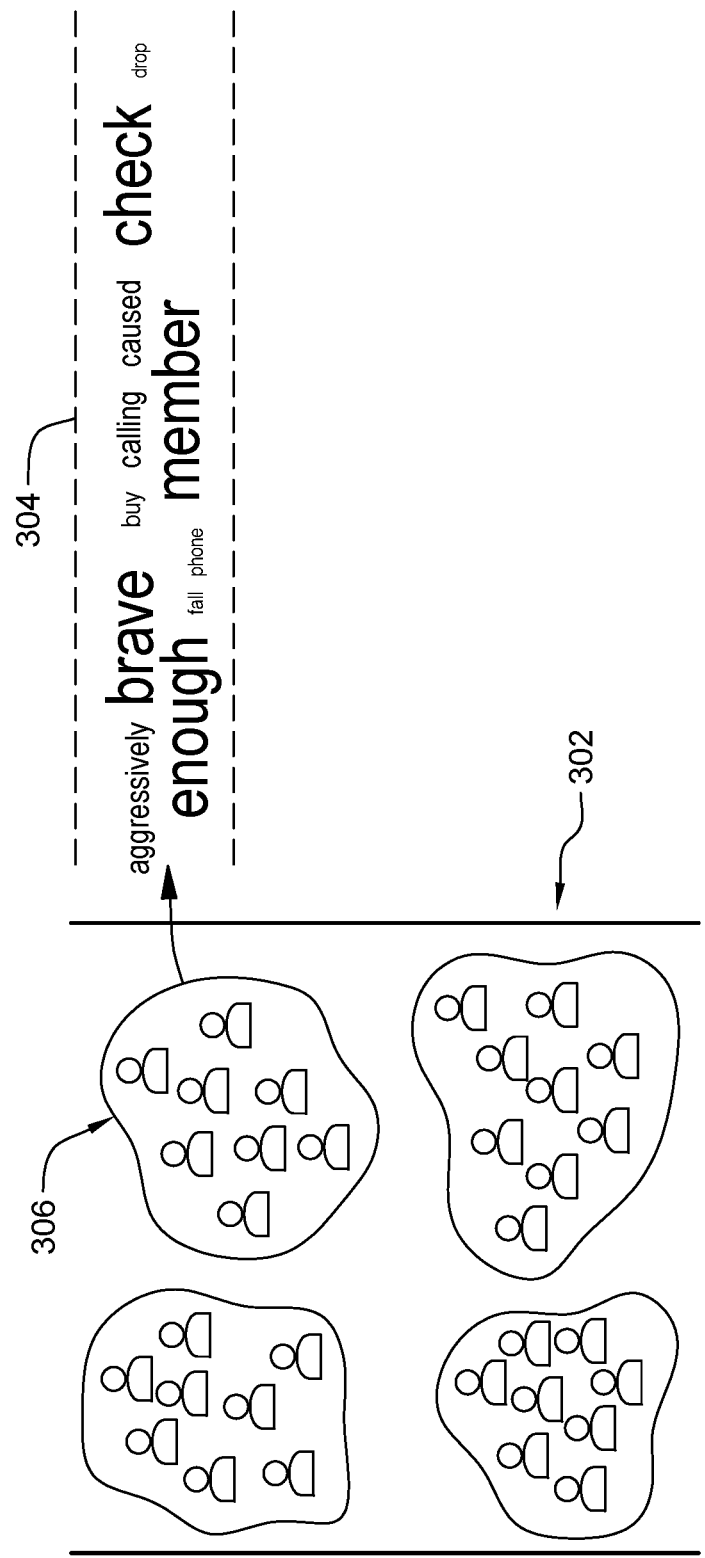
FIG. 3 shows groupings of people by their communication styles according to illustrative embodiments.

Referring now to FIG. 3 in connection with FIG. 2, groupings 302 of people by their communication styles are shown. Global set of words or phrases 304 used by a group of people 306 at a global level, in one example employees, are stored in global word and phrase database 74 (shown in FIG. 2). In one embodiment, a global set of words or phrases which are stored in database 74 are used by a set of users or people who use similar words or phrases, and are used to train global model 68 (shown in FIG. 2).

Figure 4:
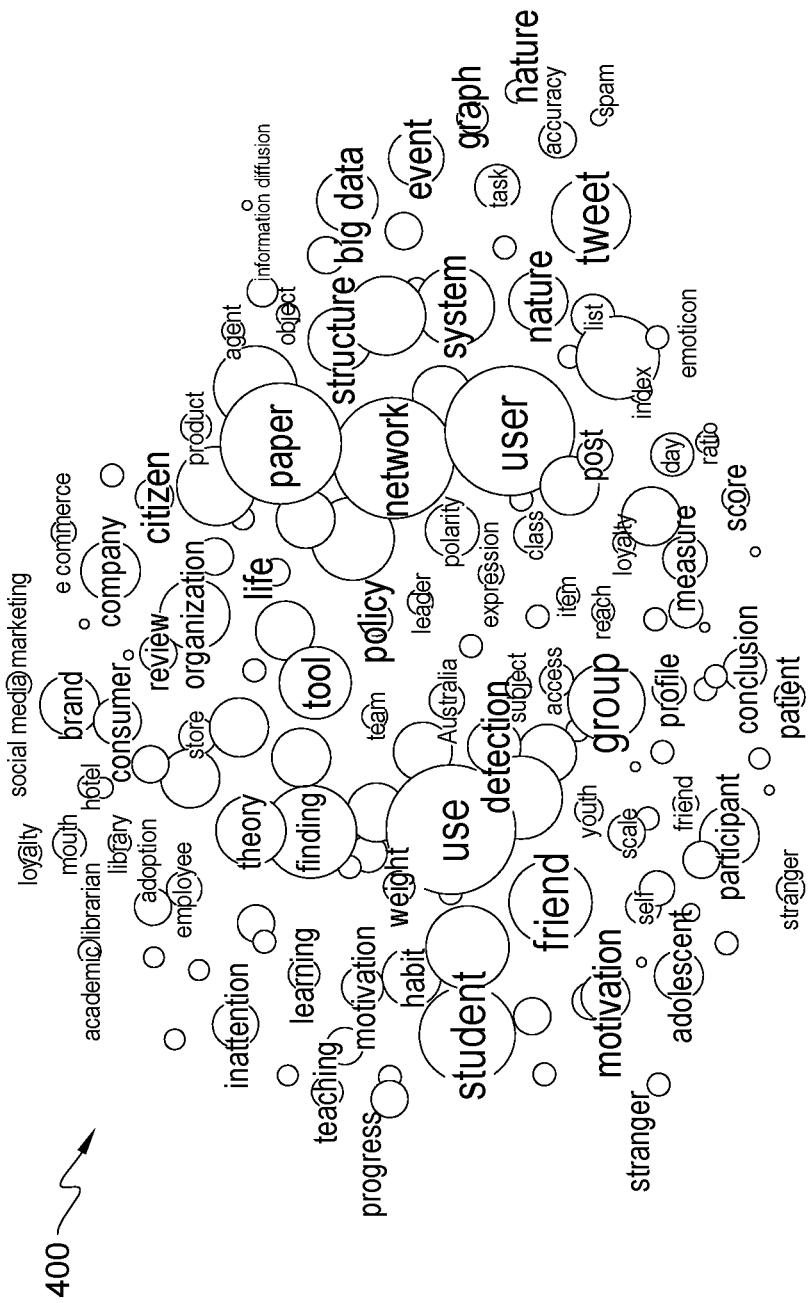
FIG. 4 shows a word usage cloud for a group of people according to illustrative embodiments.

Referring now to FIG. 4 in connection with FIG. 2, a word usage cloud 400 for a group of people is shown. Cloud 400 graphically shows the relative weights or frequencies of word or phrase usages by a group of people at a local circle level, in one example employees, that are stored in local word and phrase database 76 (shown in FIG. 2). In one embodiment, a local set of words or phrases which are stored in database 76 are used by a set of users or people who communicate with each other, and are used to train local model 69 (shown in FIG. 2).

Figure 5:
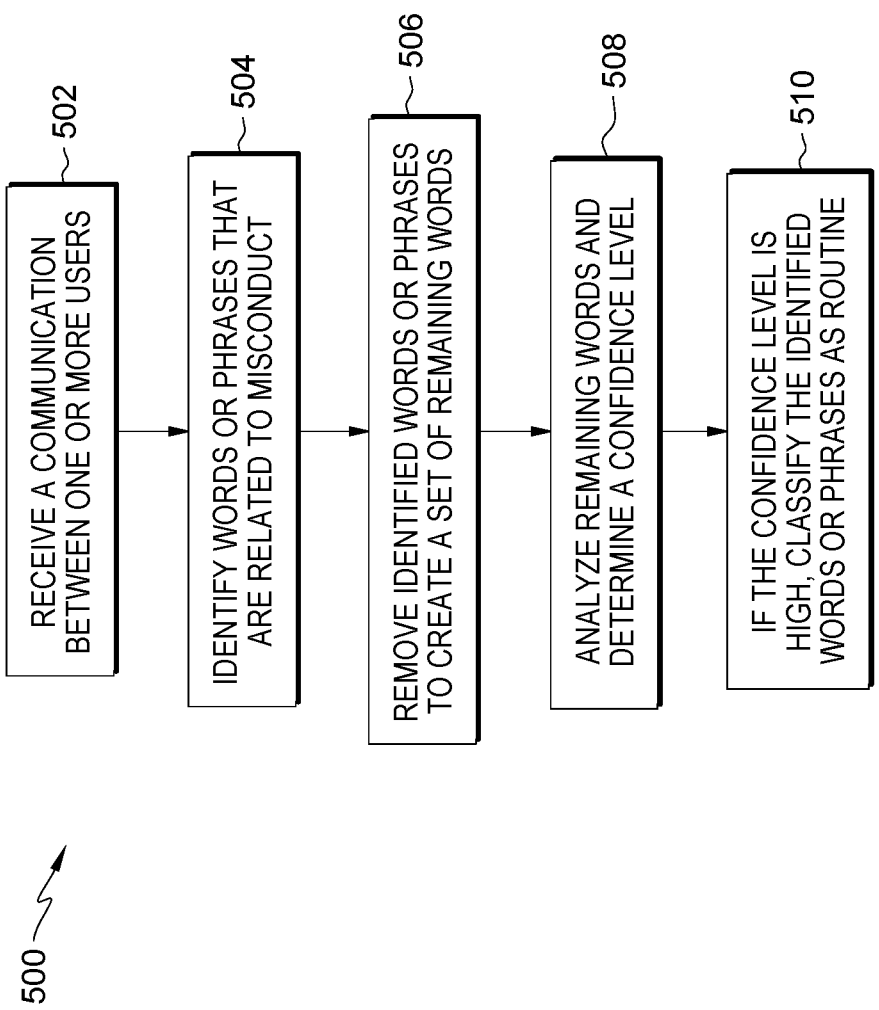
FIG. 5 shows a process flowchart for identifying routine communication content according to illustrative embodiments.

As depicted in FIG. 5, in one embodiment, a system (e.g., computer system/server 12) carries out the methodologies disclosed herein. Shown is a process flowchart 500 for identifying routine communication content. At 502, a communication between one or more users is received. At 504, words or phrases in the communication are identified that are contained in database 72 (shown in FIG. 2) of words or phrases related to misconduct. At 506, the identified words or phrases from the communication are removed to create a set of remaining words. At 508, the set of remaining words are analyzed to predict the likelihood of the removed words or phrases appearing in the communication, and a confidence level of the prediction is determined. At 510, if the determined confidence level is being high, the identified words or phrases in the communication are classified as routine or business-as-usual.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for identifying routine communication content. Thus, embodiments herein disclose a process for supporting computer infrastructure, comprising integrating, hosting, maintaining, and deploying computer-readable code into a computing system (e.g., computer system/server 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for identifying routine communication content. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is apparent that there has been provided herein approaches to identifying routine communication content. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for identifying routine communication content, comprising:
   receiving a communication between one or more users;
   identifying words or phrases in the communication that are contained in a database of words or phrases related to misconduct;
   removing the identified words or phrases from the communication to create a set of remaining words;
   analyzing the set of remaining words through applying one or more models to predict the likelihood of the removed words or phrases appearing in the communication based on relative weights or frequencies of words of phrases from among a local set of words or phrases, wherein a confidence level of the prediction is determined; and
   responsive to the determined confidence level being high, classifying the identified words or phrases in the communication as routine.

2. The method of claim 1, further comprising:
   responsive to the determined confidence level being low, classifying the identified words or phrases in the communication as non-routine, and flagging the communication for review.

3. The method of claim 2, wherein a high confidence level comprises 70% or more confidence, and a low confidence level comprises 20% or less confidence.

4. The method of claim 1, wherein applying the one or more models to the set of remaining words comprises the one or more models being trained to predict the likelihood of the removed words or phrases appearing in the communication using at least one of temporal, social network, contextual, and topical meta-data of the communication.

5. The method of claim 4, wherein the one or more models comprise long short-term memory (LSTM) recurrent neural networks (RNN).

6. The method of claim 4, wherein the one or more models are trained using a global set of words or phrases, wherein the global set of words or phrases comprises words or phrases used by a set of people who use similar words or phrases.

7. The method of claim 4, wherein the one or more models are trained using the local set of words or phrases, wherein the local set of words or phrases comprises words or phrases used by a set of people who communicate with each other.

8. A computer system for identifying routine communication content, the computer system comprising:
   a memory medium comprising program instructions;
   a bus coupled to the memory medium; and
   a processor, for executing the program instructions, coupled to a routine communication identification engine via the bus that when executing the program instructions causes the system to:
   receive a communication between one or more users;
   identify words or phrases in the communication that are contained in a database of words or phrases related to misconduct;
   remove the identified words or phrases from the communication to create a set of remaining words;
   analyze the set of remaining words through applying one or more models to predict the likelihood of the removed words or phrases appearing in the communication based on relative weights or frequencies of words of phrases from among a local set of words or phrases, wherein a confidence level of the prediction is determined; and responsive to the determined confidence level being high, classify the identified words or phrases in the communication as routine.

9. The computer system of claim 8, the instructions further causing the system to: responsive to the determined confidence level being low, classify the identified words or phrases in the communication as non-routine, and flag the communication for review.

10. The computer system of claim 9, wherein a high confidence level comprises 70% or more confidence, and a low confidence level comprises 20% or less confidence.

11. The computer system of claim 8, wherein applying the one or more models to the set of remaining words comprises the one or more models being trained to predict the likelihood of the removed words or phrases appearing in the communication using at least one of temporal, social network, contextual, and topical meta-data of the communication.

12. The computer system of claim 11, wherein the one or more models comprise long short-term memory (LSTM) recurrent neural networks (RNN).

13. The computer system of claim 11, wherein the one or more models are trained using a global set of words or phrases, wherein the global set of words or phrases comprises words or phrases used by a set of people who use similar words or phrases.

14. The computer system of claim 11, wherein the one or more models are trained using the local set of words or phrases, wherein the local set of words or phrases comprises words or phrases used by a set of people who communicate with each other.

15. A computer program product for identifying routine communication content, the computer program product comprising a computer readable hardware storage device, and program instructions stored on the computer readable hardware storage device, to:
  receive a communication between one or more users;
  identify words or phrases in the communication that are contained in a database of words or phrases related to misconduct;
  remove the identified words or phrases from the communication to create a set of remaining words;
  analyze the set of remaining words through applying one or more models to predict the likelihood of the removed words or phrases appearing in the communication based on relative weights or frequencies of words of phrases from among a local set of words or phrases, wherein a confidence level of the prediction is determined; and
  responsive to the determined confidence level being high, classify the identified words or phrases in the communication as routine.

16. The computer program product of claim 15, the computer readable storage device further comprising instructions to:
  responsive to the determined confidence level being low, classify the identified words or phrases in the communication as non-routine, and flag the communication for review.

17. The computer program product of claim 16, wherein a high confidence level comprises 70% or more confidence, and a low confidence level comprises 20% or less confidence.

18. The computer program product of claim 15, wherein applying the one or more models to the set of remaining words comprises the one or more models being trained to predict the likelihood of the removed words or phrases appearing in the communication using at least one of temporal, social network, contextual, and topical meta-data of the communication.

19. The computer program product of claim 18, wherein the one or more models comprise long short-term memory (LSTM) recurrent neural networks (RNN).

20. The computer program product of claim 18, wherein the one or more models are trained using a global set of words or phrases or the local set of words or phrases, wherein the global set of words or phrases comprises words or phrases used by a set of people who use similar words or phrases, and wherein the local set of words or phrases comprises words or phrases used by a set of people who communicate with each other.

\* \* \* \* \*